Dec. 5, 1950   E. A. MASTRIANI   2,533,130
SHIPPER MECHANISM
Filed Sept. 9, 1948
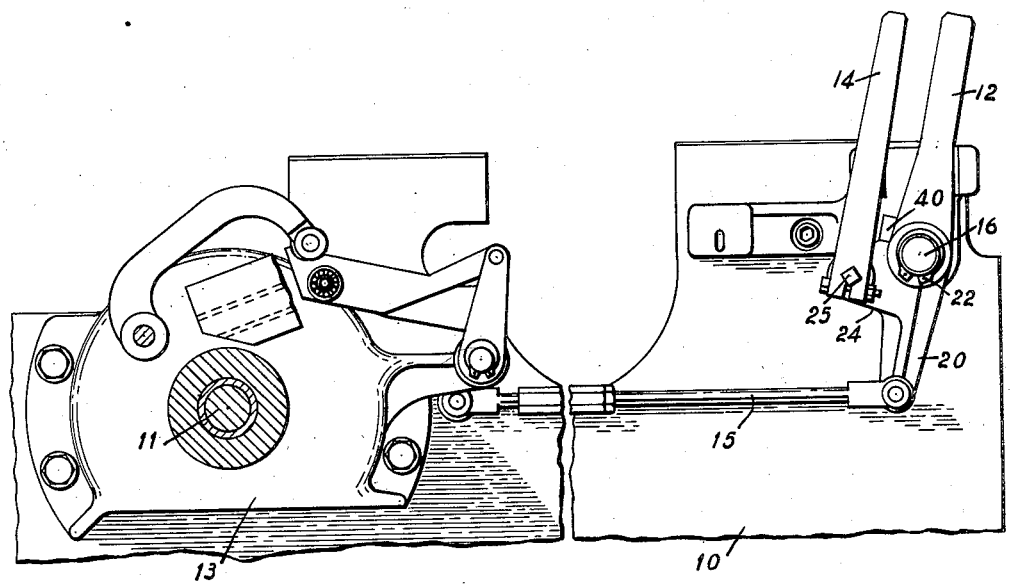
Fig. 1
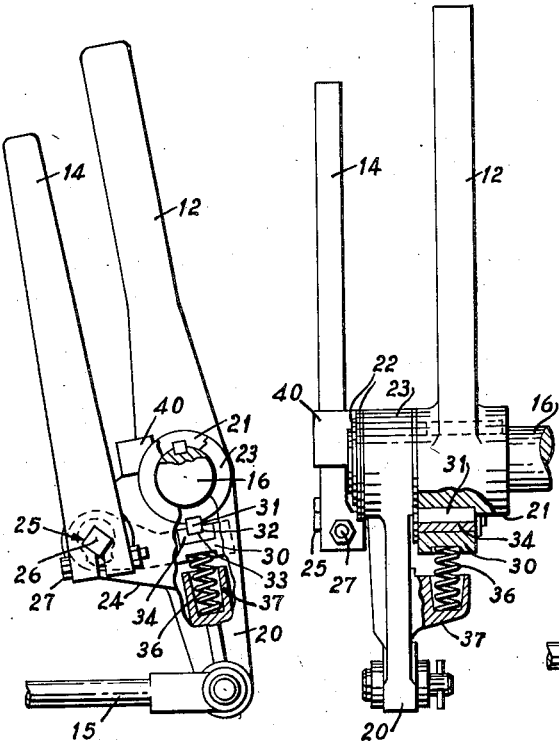
Fig. 2
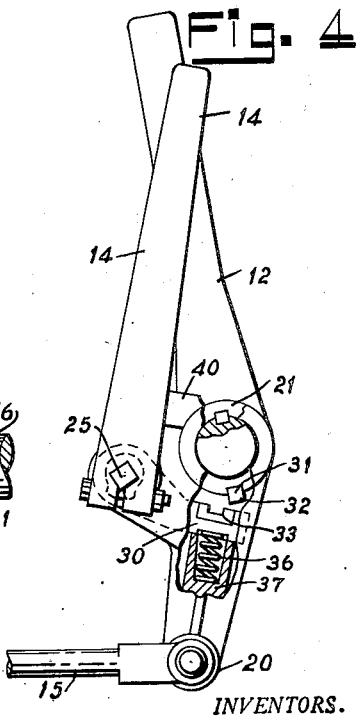
Fig. 3
Fig. 4
INVENTORS.
ELVIN A. MASTRIANI
BY Virgil F. Davrio
ATTORNEY Patented Dec. 5, 1950

2,533,130

UNITED STATES PATENT OFFICE 2,533,130

SHIPPER MECHANISM

Elvin A. Mastriani, Newark, N. J., assignor, by mesne assignments, to Steel and Alloy Tank Company, Newark, N. J., a corporation of New Jersey Application September 9, 1948, Serial No. 48,405

11 Claims. (Cl. 139—336)

1

The present invention relates to shipper and brake mechanisms for a loom and more particularly to the interconnecting means by which the shipper handle and the brake handle may be either interlocked for operation in unison or disengaged for separate operations.

In the conventional loom, a clutch is provided for connecting and disconnecting power to the loom. This clutch may be engaged or disengaged through manipulation of a shipper handle and is usually automatically disengaged when protective operations are brought into action, as for example, when the filling fails, when the warp fails and when the shuttle fails to box. A brake device is also provided to stop the loom automatically whenever such protective operations are brought into action. A brake handle is provided for manual control of the brake device.

One object of the present invention is to provide between the shipper handle and brake handle, a new and improved connection of the type which locks these handles automatically for movement in unison, to apply the brake when the shipper handle is moved to loom stopping position and which is automatically disengageable, to permit manual release of said brake after the loom has stopped and thereby to permit the loom to be turned over by hand.

Various objects of the invention are apparent from the following description and from an inspection of the accompanying drawings, in which:

Fig. 1 is a longitudinal section of the loom and shows somewhat diagrammatically the shipper handle in power connecting position, the brake handle in brake releasing position, the brake operatable through said brake handle and the mechanism interconnecting said handles and embodying the present invention;

Fig. 2 is a side view, partly broken away, of the shipper and brake handle assembly and shows both of the handles in power disconnecting brake applying position;

Fig. 3 is an end view, partly broken away, of the shipper and brake handle assembly shown in Fig. 2; and Fig. 4 is a side view, partly broken away, of the shipper and brake handle assembly, and shows the shipper handle in power disconnecting position and the brake handle in brake releasing position.

Referring to the drawings, the invention is applied to a loom having loomsides 10 (only the right-hand loomside being shown) and having a crank shaft 11 operated by a motor or other source of power (not shown), a clutch (not shown) between the source of power and said crank shaft, a shipper handle 12 for manually controlling the engagement or disengagement of the clutch, a brake 13, shown, for example, as of the internal expanding type and a brake handle 14 for manually controlling the application or release of said brake through a power transmission including an interconnecting brake rod 15.

The shipper handle 12 is automatically thrown out of its on, power connecting or loom operating position shown in Fig. 1 into the off, power disconnecting or loom stopping position shown in Fig. 2 by suitable protective motions brought into action when the filling runs out or breaks, when the warp breaks or when the shuttle fails to enter either box properly. At the same time, the brake handle 14 is moved in unison with said shipper handle by the interconnecting mechanism of the present invention from the brake releasing position shown in Fig. 1 to the brake applying position shown in Fig. 2, to stop the loom almost instantaneously.

The shipper handle 12 is keyed or otherwise secured to a shaft 16 journalled in the loomside 10 and serving to engage or disengage the clutch between the source of power and the crank shaft 11 controlling the operation of the loom. The protective motions described act upon this shaft upon receipt of protective impulses to rotate this shaft into clutch disengaging position.

The interconnecting mechanism of the present invention comprises a depending brake arm 20 journalled at its upper end on the clutch shaft 16 and pivotally secured at its other end to the brake rod 15. The clutch shaft 16 projects beyond the hub 21 of the shipper handle 12 to receive pivotally the journalled end of the brake arm 20. Snap or retaining washers or rings 22 are shown to hold the hub 23 of the brake arm 20 against outward displacement axially along the projecting end of the clutch shaft 16.

The brake arm 20 has a lateral extension 24 on which is journalled a brake handle pivot shaft 25 spaced from the clutch shaft 16. The brake handle 14 is located on the side of the brake arm 20 opposite the shipper handle 12 and is secured to the pivot shaft 25 by providing a square end 26 to said pivot shaft and splitting the lower end of said brake handle to clamp it releasably on to said square end by means of a bolt 27.

For locking the brake arm 20 to the hub 21 of the shipper handle 12, to effect angular movement of said brake arm and the brake handle 14 in unison with said shipper handle, upon movement of said latter handle from power connecting position shown in Fig. 1 to power disconnecting position shown in Fig. 2, the brake handle pivot shaft 25 has keyed or otherwise affixed thereto a detent 30 operatable directly underneath the shipper handle hub 21. The hub 21 has secured to the periphery thereof, as for example, by press fitting, a key 31 shown in the form of a bar of rectangular cross-section extending along said hub and having a part 32 projecting outwardly beyond the outer periphery of said hub. The detent 30 has a recess or keyway 33 of cross-section corresponding to the cross-section of the projecting part 32 of the key 31 and of corresponding length to receive said projecting part freely therein in interlocked relationship therewith. The keyway 33 is formed for wear resisting purposes in a hardened insert 34 of the detent 30 and is adapted to receive snugly the projecting part 32 of the key 31 in the relative positions of the shipper and brake handles 12 and 14 shown in Figs. 1 and 2 and to lock thereby said handles for unisonal operation, while held in said relative positions.

The detent 30 is urged angularly towards locking position with respect to the key 31 by means of a coil spring 36 which is seated at one end in a cup 37, forming an extension of the brake arm 20 and which bears at the other end against the underside of said detent.

To lock the brake arm 20 to the brake handle 14 for unisonal movement, while said brake handle is being moved from the brake applying position shown in Fig. 2 to the brake releasing position shown in Fig. 1, said brake arm has at its upper end above the center of its hub 23, a shouldered projection 40 located in the path of the brake handle 14 to engage said brake handle, when said brake handle is moved clockwise about the axis of its pivot shaft 25 between the positions of Figs. 2 and 4. When the brake handle 14 is thus moved clockwise about the axis of its pivot shaft 25, it engages the shouldered projection 40, so that upon continued movement of said brake handle clockwise, said brake handle and the brake arm 20 will be locked together for rotation clockwise about the clutch shaft 16 towards brake releasing position shown in Fig. 4.

In the operation of the handle connecting mechanism described, when the shipper handle 12 and the brake handle 14 are in the angular substantially parallel positions shown in Fig. 1, the clutch will be engaged, the brake will be released and the loom will be running. In these power connecting brake releasing positions of the shipper handle 12 and brake handle 14, the key 31 will be seated in the keyway 33, to lock the detent 30 to the hub 21 of said shipper handle, and said brake handle will be blocked against counter-clockwise rotation with respect to said shipper handle by the detent 30 bearing upwardly against the underside of said hub along a direction extending diametrically of said hub. Also, in these positions of the shipper handle 12 and the brake handle 14, clockwise rotation of said brake handle relative to the shipper handle 12 will be blocked by the shouldered projection 40, after said brake handle has been rotated through a small clearance distance.

The only way in which the clutch can be manually disengaged to disconnect power to the loom, is to move the shipper handle 12 counter-clockwise from the on or power connecting position shown in Fig. 1 to the off or power disconnecting position shown in Fig. 2. Since the hub 21 of the shipper handle 12 is locked to the detent 30 through the key and keyway connection 31 and 33 and since this detent is connected to the brake handle pivot shaft 25 journalled in the brake arm 20 below the axis of said hub, the counter-clockwise rotation of said shipper handle from on position shown in Fig. 1 to off position shown in Fig. 2, causes related counter-clockwise movement of the brake arm 20 with the clutch shaft 16 into position to apply the brake 13 and corresponding movement of the brake handle 14 into the angular position shown in Fig. 2.

The movement of the shipper handle 12 from on position shown in Fig. 1 to off position shown in Fig. 2 may be effected either manually directly through manipulation of said handle or automatically and indirectly through the protective motions acting upon the clutch shaft 16. In either case, the movement of the shipper handle 12 to off position causes corresponding movement of the brake arm 20 into position to apply the brake 13 and correlated movement of the brake handle 14.

If it is desired to maintain the power disconnected from the loom and to release the brake 13, so that the loom may be turned over manually, the brake handle 14 is moved angularly clockwise about the axis of the pivot shaft 25 from brake applying position shown in Fig. 2 towards brake releasing position shown in Fig. 4. Initially, this movement of the brake handle causes the detent 30 to move against the action of the spring 36 out of locking position with respect to the key 31 on the hub 21 of the shipper handle 12 and causes thereby the brake arm 20 to be released from locking position with respect to said hub. The brake arm 20 is thereby freed for rotation with respect to the clutch shaft 16. Further clockwise movement of the brake handle 14 causes said handle to engage the shouldered projection 40 on the released brake arm 20 and to rotate thereby said brake arm clockwise about the clutch shaft 16. In the position of the parts shown in Fig. 2, the shouldered projection 40 is so spaced from the edge of the brake handle 14 as to permit said brake handle to be rotated clockwise from said position about the axis of the pivot shaft 25 a distance sufficient to release the detent 30 from locking engagement with the key 31, before said brake handle reaches said shouldered projection.

Clockwise rotation of the brake arm 20 about the clutch shaft 16 into the position shown in Fig. 4 releases the brake 13 and permits thereby the loom to be turned over by hand for resetting or for any other reason. While the brake handle 14 is being moved towards brake releasing position shown in Fig. 4, the shipper handle 12 is maintained in the clutch disengaged or power disconnected position.

When it is desired to operate the loom again, the shipper handle 12 is rotated clockwise from the off position in Fig. 4 to the on position shown in Fig. 1. When the key 31 reaches a position opposite the keyway 33, during this movement of the shipper handle 12, the spring 36 will cause the detent 30 to snap upwardly into position to seat said key into said keyway and to lock thereby the hub 21 of the shipper handle 12 with said detent. This in turn will lock the brake arm 20 to the hub 21 of the shipper handle 12 in preparation for the next loom shut-down operation, as already described.

While the invention has been described with particular reference to a specific embodiment, it is to be understood that it is not to be limited thereto but is to be construed broadly and re-

What is claimed is:

1. In a loom, a shipper mechanism for connecting and disconnecting power to the loom including a shipper handle, a brake mechanism for stopping the loom including a brake handle, means automatically locking said handles for movement in unison from power connecting brake releasing positions to power disconnecting brake applying positions, and means for releasing said locking means automatically upon movement of said brake handle from brake applying position towards brake releasing position, to permit said brake handle to be moved into brake releasing position, while said shipper handle remains in power disconnecting position.

2. In a loom, a shipper mechanism for connecting and disconnecting power to the loom including a clutch engaging and disengaging shaft, and a shipper handle secured to said shaft for angular movement therewith, a brake mechanism for stopping the loom including a brake handle, means automatically locking said brake handle to said shipper handle for angular movement in unison with said shaft about the axis of said shaft from power connecting brake releasing positions to power disconnecting brake applying positions, and means for disengaging said locking means to permit angular movement of said brake handle about said shaft from brake applying position to brake releasing position, while said shipper handle and said shaft remain in power disconnecting positions.

3. In a loom, the combination as described in claim 2, in which said disengaging means is automatically operatable upon movement of said brake handle from brake applying position towards brake releasing position.

4. In a loom, the combination as described in claim 2, in which said shaft is connected to various protective motions of said loom, to permit it to be operated automatically into power disconnecting rotative position by said protective motions or manually by manipulation of said shipper handle.

5. In a loom, a shipper mechanism for connecting and disconnecting power to the loom including a clutch engaging and disengaging shaft, and a shipper handle secured to said shaft for angular movement therewith, a brake mechanism for stopping the loom including a brake, a brake handle, and a power transmission between said brake handle and said brake comprising a brake arm journalled on said shaft, means automatically locking said brake arm, said brake handle and said shipper handle for movement in unison from power connecting brake releasing positions to power disconnecting brake applying positions, means for disengaging said locking means to permit movement of said brake handle from brake applying position to brake releasing position, while said shaft and said shipper handle are in power disconnecting positions, and means for locking said brake arm and said brake handle for movement in unison about said shaft upon movement of said brake handle from brake applying position to brake releasing position.

6. In a loom, the combination as described in claim 5, in which said disengaging means is automatically operatable upon movement of said brake handle from brake applying position towards brake releasing position.

7. In a loom, a shipper mechanism for connecting and disconnecting power to the loom including a shipper handle mounted for angular movement about an axis, a brake mechanism for stopping the loom including a brake, a brake handle, and a power transmission between said brake handle and said brake comprising a brake arm journalled for angular movement about an axis, said brake handle being supported on said brake arm for limited angular movement with respect to said brake arm about an axis spaced from the other axes, detent means for locking said handles together automatically when said handles are in power connecting brake releasing positions, said locking means being operatable to cause said handles to move angularly in unison about said first-mentioned axis from power connecting brake releasing positions to power disconnecting brake applying positions, means automatically operatable upon movement of said brake handle about said third-mentioned axis from brake applying position towards brake releasing position for releasing said detent means, and means for locking said brake handle and said brake arm for angular movement about said second-mentioned axis, after said detent means has been released to effect angular movement of said brake handle and said brake arm in unison about said second-mentioned axis towards brake releasing position, while said shipper handle remains in power disconnecting position.

8. In a loom, a shipper mechanism for connecting and disconnecting power to the loom including a clutch engaging and disengaging shaft, and a shipper handle having a hub secured to said shaft to cause said handle to move angularly with said shaft, a brake mechanism for stopping the loom including a brake, a brake handle, and a power transmission between said brake handle and said brake comprising a brake arm journalled on said shaft, said brake handle being supported on said brake arm for limited angular movement with respect to said brake arm about an axis spaced from the axis of said shaft, a detent rigid with said brake handle, means for locking said detent to said hub when said brake handle and said shipper handle are in power connecting brake releasing positions and comprising spring means urging said detent towards locking position with respect to said hub, whereby said shipper handle, said brake handle and said brake arm are interlocked for angular movement in unison with said shaft from power connecting brake releasing positions to power disconnecting brake applying positions, said detent being adapted to be moved against the action of said spring means out of locking engagement with said hub automatically upon angular movement of said brake handle about said first-mentioned axis from brake applying position towards brake releasing position, and means operatable upon continued movement of said brake handle towards brake releasing position for locking said brake handle to said brake arm, to cause movement of said brake handle and said brake arm in unison about said shaft towards brake releasing position, while said shaft and said shipper handle remain in power disconnecting positions.

9. In a loom, the combination as described in claim 8, said detent extending below said hub, and said spring means comprising a cup shaped member rigid with said brake arm, and a coil spring seated at one end in said cup shaped member and bearing at its other end against the underside of said detent.

10. In a loom, a shipper mechanism for connecting and disconnecting power to the loom including a clutch engaging and disengaging shaft and a shipper handle secured to said shaft to cause said handle to move angularly with said shaft, a brake mechanism for stopping the loom including a brake, a brake handle member, and a power transmission between said brake handle member and said brake comprising a brake arm member journalled on said shaft, said brake handle member being supported on said brake arm member for limited angular movement with respect to said brake arm member about an axis spaced from the axis of said shaft, means for locking said brake arm member to said shipper handle automatically when said brake arm member and said shipper handle are in power connecting brake releasing positions to cause said brake arm member, said brake handle member, said shipper handle and said shaft to move angularly about the axis of said shaft in unison into power disconnecting brake applying positions upon actuation of said shipper handle on said shaft into power disconnecting position, means automatically operatable upon movement of said brake handle member about said first-mentioned axis from brake applying position towards brake releasing position for releasing said locking means, and a shouldered projection on one of said members in the path of travel of the other member during its movement from brake applying position towards brake releasing position, said projection being adapted to lock said members for angular movement in unison about said shaft towards brake releasing position, while said shipper handle remains in power disconnecting position.

11. In a loom, a shipper mechanism for connecting and disconnecting power to the loom including a clutch engaging and disengaging shaft, and a shipper handle having a hub member secured to said shaft to cause said handle to move angularly with said shaft, a brake mechanism for stopping the loom comprising a brake, a brake handle, and a power transmission between said brake handle and said brake comprising a brake arm journalled on said shaft, said brake handle being supported on said brake arm for limited angular movement with respect to said brake arm about an axis spaced from the axis of said shaft, a detent member rigid with said arm, one of said members having a key rigid therewith, while the other member has a keyway for locking engagement with said key, spring means urging said detent member towards said hub member to effect locking engagement between said key and said keyway when said handles are in power connecting brake releasing position, whereby said shipper handle, said brake handle and said brake arm are interlocked for angular movement in unison with said shaft from power connecting brake releasing positions to power disconnecting brake applying positions, said detent member being adapted to be moved against the action of said spring to effect disengagement of said key and said keyway automatically upon angular movement of said brake handle about said first-mentioned axis from brake applying position towards brake releasing position, and means operatable upon continued movement of said brake handle towards brake releasing position for locking said brake handle to said brake arm to cause movement of said brake handle and said brake arm in unison about said shaft towards brake releasing position, while said shaft and said shipper handle remain in power disconnecting positions.

ELVIN A. MASTRIANI.

REFERENCES CITED

The following references are of record in the file of this patent:

UNITED STATES PATENTS

| Number | Name | Date |
| --- | --- | --- |
| 1,428,410 | Zeedyk | Sept. 5, 1922 |
| 1,620,194 | Davis | Mar. 8, 1927 |
| 1,631,067 | Seville | May 31, 1927 |
| 1,834,352 | Seville | Dec. 1, 1931 |